United States Patent
Ullstig

[11] 3,977,760
[45] Aug. 31, 1976

[54] DEVICE FOR OPTICAL-MECHANICAL SCANNING

[75] Inventor: Stig Leopold Ullstig, Taby, Sweden

[73] Assignee: AGA Aktiebolag, Lidingo, Sweden

[22] Filed: Feb. 11, 1975

[21] Appl. No.: 548,917

[30] Foreign Application Priority Data
Feb. 14, 1974 Sweden............................ 7401986

[52] U.S. Cl. ................................... 350/6; 250/235
[51] Int. Cl.² ...................... G02B 27/17; H01J 3/14
[58] Field of Search ................ 350/6, 7, 285, 286,
350/287, 289; 250/236, 235, 203; 356/167,
203; 178/7.6

[56] References Cited
UNITED STATES PATENTS

| | | | |
|---|---|---|---|
| 1,883,019 | 10/1932 | Shore | 350/287 |
| 2,967,246 | 1/1961 | Ostergren | 250/236 |
| 2,975,668 | 3/1961 | Eckel | 350/6 |
| 3,253,498 | 5/1966 | Lindberg et al. | 350/6 |

Primary Examiner—John K. Corbin
Assistant Examiner—Jon W. Henry
Attorney, Agent, or Firm—Lerner, David, Littenberg & Samuel

[57] ABSTRACT

A device for optical-mechanical scanning within the visual or infrared wavelength range, including an optical device to supply radiation from an image field to a rotating refracting optical means and then to a detecting means to receive and detect radiation passing through the rotating refracting means.

The device produces a spiral or radial sweep during the scanning of an object and is composed of a rotating refracting optical means with at least a pair of surfaces parallel to each other through which incident and outgoing radiation is received and transmitted. The optical means is rotated around the optical axis of the scanning system and rotated or swayed around an axis which is principally perpendicular to the optical axis. Thus, two-dimensional scanning of an object is obtained by means of one scanning means pivoting around two axes. Depending upon the angular velocities around said axes spiral scanning or radial scanning can be obtained.

5 Claims, 3 Drawing Figures

DEVICE FOR OPTICAL-MECHANICAL SCANNING

BACKGROUND OF THE INVENTION

In the past, optical-mechanical scanning within the infrared or visual range including rotating optical means for such scanning required more than one scanning means to achieve two-dimensional scanning and, further, required expensive asymmetrical correction lenses to correct for the fact that aberrations have not been rotationally symmetrical and have thus been difficult to correct.

SUMMARY OF THE INVENTION

An important advantage in accordance with the present invention is that aberrations become rotationally symmetrical around the optical axis and are thus easy to eliminate by means of rotational symmetrical lenses. Thus, one is not obliged to use expensive asymmetrical correction lenses but much cheaper rotational symmetrical lenses can be used. In one form of the present invention, the rotating refracting optical means is composed of a body of two surfaces parallel to each other in the form of a cylinder. This is inexpensive to manufacture since the number of refracting surfaces is small (only two) and the amount of radiating and absorbing material in the ray path is also small. Such a means is also light in weight which is of further importance since it must also rotate.

In another embodiment the rotating, refracting optical means is a polygon cylinder which rotates around its symmetry axis, which is perpendicular to the optical axis of the system, and also rotates around the aforementioned optical axis.

An advantage with this device according to the invention is that combined with a simple detector means it gives a picture of the object with excellent resolution.

Although this invention will be described with respect to its preferred embodiments, it should be understood that many variations and modifications will be obvious to those skilled in the art, and it is preferred, therefore, that the scope of the invention be limited, not by the specific disclosure herein, but only by the appended claims.

DETAILED DESCRIPTION OF THE DRAWINGS

Figure 1:
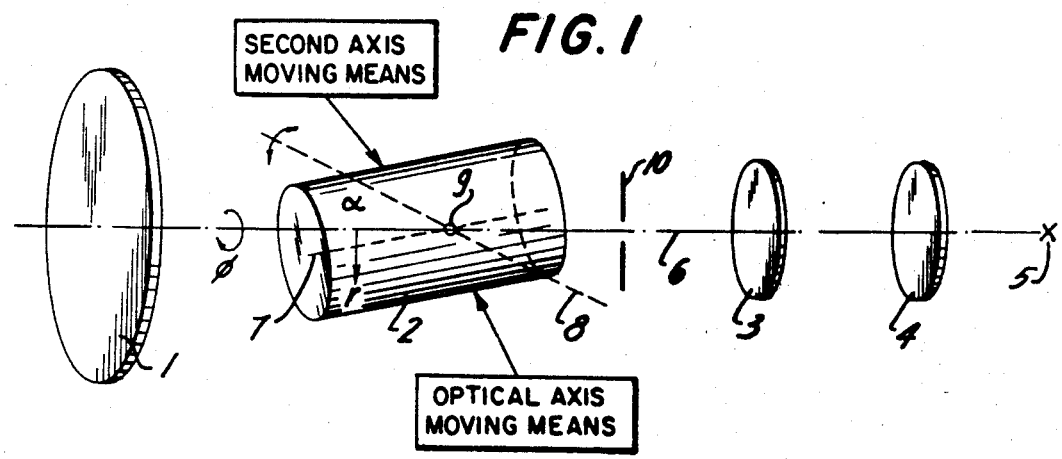
FIG. 1 shows an embodiment of the device in accordance with the teachings of the present invention.

In FIG. 1, there is shown an embodiment of a device built in accordance with the principles of the present invention. An optical means 1 collects the radiation from an image field and feeds the radiation into a rotating, refracting optical means 2. In the figure, the optical means 1 is shown as a lens.

After the radiation has passed through the means 2, it hits a detector 5, only shown schematically in the figure. Several different types of more or less known detectors may be used for the detector. In the FIG. 1 embodiment, two lenses 3 and 4 and an aperture 10, are placed between the means 2 and the detector 5.

The optical axis of the system is denoted 6. The rotating, refracting means 2 in the figure is drawn as a straight cylinder whose two parallel end surfaces form a surface of incidence and an outlet surface for the radiation respectively. The symmetry axis of the cylinder 2 is denoted as 7, and its center of gravity as 9. The cylinder 2 is arranged so as to rotate around the optical axis, and also to carry out a swaying movement around an axis 8 through the center of gravity 9, said axis being orthogonal to the optical axis 6. Furthermore, the cylinder is placed so that the optical axis 6 goes through the center of gravity 9 of the cylinder.

In FIG. 1, the cylinder 2 can thus be rotated around the two horizontal axes 6 and 8 in the figure. The symmetry axis 7 of the cylinder 2 coincides with the optical axis 6 in the system when the end surfaces of the cylinder are perpendicular to this axis 6. Here the angle between the symmetry axis 7 and the optical axis 6 which is marked $\alpha$ in the figure is 0.

As previously mentioned, the cylinder 2 carries out a swaying movement around the axis 8. This swaying movement starts best from a certain position when the angle $\alpha$ is equal to $\alpha_1$. The cylinder then sways so that the angle $\alpha$ is reduced to 0 and increases again and gains an equally large angle $\alpha_1$, but on the opposite side from the axis 6. From here, the cylinder 2 returns to its starting position. In an embodiment of the device according to the invention, this return movement can take place as quickly as possible. The cylinder rotates the whole time around the axis 6 during this swaying process. The position vector for an image point in this image plan is marked r in the figure. The position vector $r$ is proportional to the angle $\alpha$. Furthermore, the slope of the image point's position vector $r$ against a reference axis perpendicular to the optical axis 6 is marked $\phi$ in the figure. A vertically moving axis may, for example, be chosen for this reference axis in the figure. It can be seen from the figure that the position vector r is drawn so that the angle $\phi$ has a value of 180°.

The field of image can be arbitrarily scanned by varying the connection between the angle $\alpha$ and the angular velocity. There are, however, two important special cases: the angular velocity around the optical axis 6 is constant, i.e. $\dot{\phi} = d\phi/dt$ = constant, while the angular velocity around the axis 8 is constant, i.e. $\dot{\alpha} = d\alpha/dt$ = constant and $\dot{\phi} >> \dot{\alpha}$. This provides scanning along a spiral with a constant rise.

The second special case is where the angular velocity around the optical axis multiplied by the absolute value of the angle around the axis 8 is to be constant, i.e. $\dot{\phi} |\alpha|$ = constant, while the angular velocity around the axis 8 is to be constant, i.e. $\dot{\alpha}$ = constant and that $\dot{\phi}_{min} >> \dot{\alpha}$ whereby scanning is obtained along a spiral with a constant rise and approximate constant speed along the track (except in the center). In this way, the forced motion of the angular velocity around the optical axis of the varying moment of inertia in the cylinder becomes easier. It should be mentioned in this connection that the optical means 2 need not necessarily be in the form of a cylinder, nor the means 2, together with devices for producing the second movement, be given such a form that maximum facility of the mentioned forced motion be obtained in it, such that advantage is taken of the varying moment of inertia in the system. In another case, the cylinder could well be part of a sphere which would give a chiefly constant moment of inertia.

Figure 2:
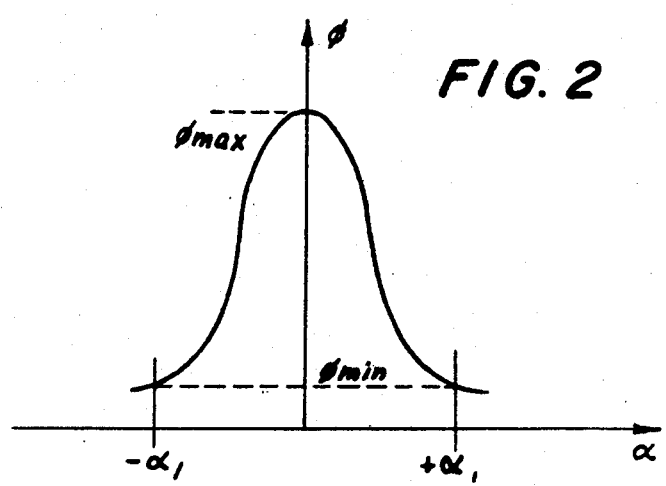
FIG. 2 shows a diagram which clarifies the movement of the device in FIG. 1.

FIG. 2 shows graphically and very roughly how $\dot{\phi}$ can vary with the angle $\alpha$. The maximum value of the angular velocity $\dot{\phi}$ ($\dot{\phi}_{max}$), which is included in the figure, is a practical limitation since theoretically the angular velocity $\dot{\phi}$ will be infinite since $\alpha = 0$.

Figure 3:
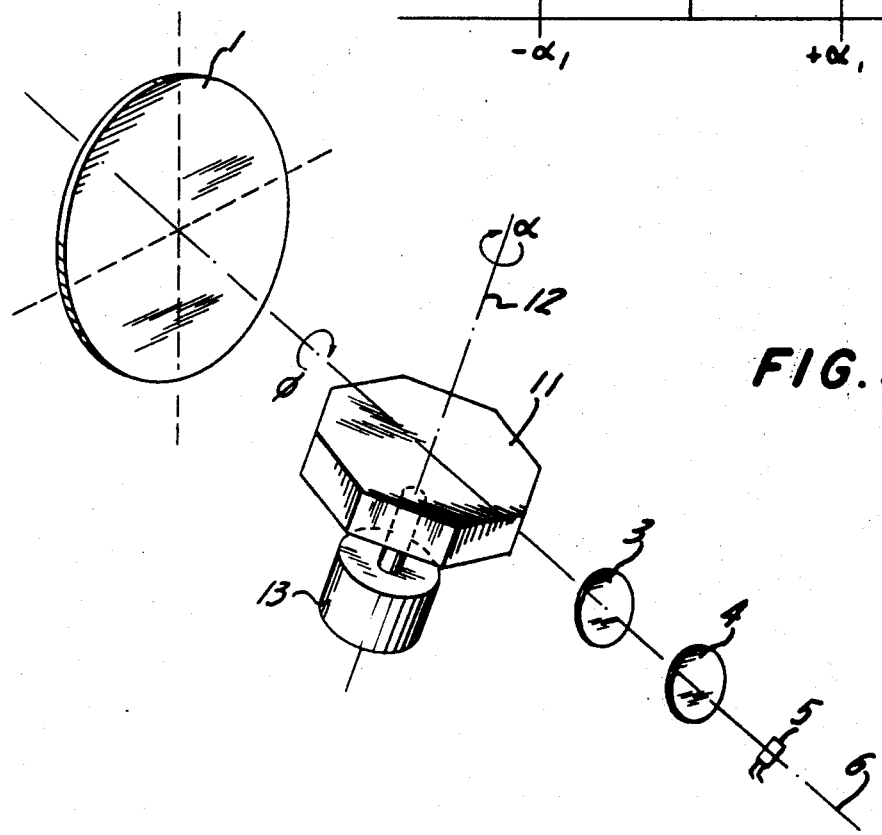
FIG. 3 shows a further embodiment of the device according to the invention.

In FIG. 3 which shows a further embodiment of the device according to the invention, an object lens is denoted 1 and a detector 5. Between the lens 1 and the detector 5, a rotating, refracting optical means 11 is installed. In this embodiment, the means 11 consists of an eight-sided polygonal cylinder. Between the polygonal cylinder 11 and the detector 5 in the figure two lenses 3 and 4 are shown.

The optical axis of the system is denoted 6. The polygon cylinder 11 is rotating around the optical axis 6 and also around its own symmetry axis 12. The rotation around the symmetry axis 12 takes place, for example, by means of an electric motor 13. On the other hand, there is no indication in the figure as to the appliances necessary to make the cylinder rotate around the optical axis.

It can be pointed out here that the means that cause the rotating optical means in the various embodiments to rotate and sway around their various axes can be known mechanical or electro-mechanical means, and it is not considered necessary for the comprehension of the invention to give a detailed description of how these rotations and swaying movements are produced.

The torsional angle of the polygonal cylinder 11 around its symmetry axis 12 is denoted $\alpha$. In the figure $\phi$ is the torsional angle of the polygonal cylinder around the optical axis.

In connection with FIG. 1 it was mentioned that the refracting optical means in this figure had a swaying movement around an axis perpendicular to the optical axis. Here the swaying took place rather slowly in one direction and afterwards the swaying means was quickly returned to its original position. In the case of the device according to FIG. 3, this swaying and quick return is replaced by several sides of the polygon cylinder being successively brought into the ray path. The return of the cylinder in FIG. 1 corresponds to the removal of the ray path from one side of the polygonal cylinder to the next.

Various types of scanning are obtained by varying the angular velocities around the axes 6 and 12. If the angular velocity around the optical axis is much larger than the angular velocity around the axis 12, i.e. $\dot\phi>>\dot\alpha$, the image field is scanned in a spiral. If, on the other hand, the angular velocity around the optical axis is much smaller than the angular velocity around the axis 12, i.e. $\dot\phi>>\dot\alpha$ the image field is scanned radially, or in other words as a rotating diameter. Combinations of these named cases can also be of interest for special purposes, e.g. for scanning along a rotating S-shaped line.

The rotational symmetrical lenses shown in the figures are, of course, shaped so as to eliminate the rotational symmetrical aberration mentioned at the beginning of the description.

Finally, it must be mentioned that apart from infrared radiation, the scanning system according to the invention can also be used for visible light and ultra-violet radiation. Naturally, the optical elements in the device must in each case be adjusted to the wavelength range for which the scanning is intended, e.g. with regard to transmission and refractive index.

Although this invention has been described with respect to its preferred embodiments, it should be understood that many variations and modifications will now be obvious to those skilled in the art, and it is preferred, therefore, that the scope of the invention be limited, not by the specific disclosure herein but only by the appended claims.

I claim as my invention:

1. A device for optical-mechanical scanning having an optical axis, said device including:
   detecting means located at a first position on said optical axis to receive and detect radiation;
   rotating refracting optical means located at a second position on said optical axis, said optical means having a pair of mutually parallel sides and a first axis normal to said parallel sides, said optical means being mounted with said first axis displaceable from said optical axis;
   means for rotating said optical means about said optical axis;
   and means for oscillating said optical means through a limited angular amount about a second axis orthogonal to said optical axis so that said pair of parallel sides always intersect said optical axis.

2. The device for optical scanning of claim 1, wherein said means for moving said optical means are constructed and arranged to carry out a forward and return movement of said optical means around said second axis.

3. The device for optical-mechanical scanning of claim 1, wherein the angular velocities around said optical and said second axes are constant, the angular velocity around said optical axis being very much larger than the angular velocity around said second axis whereby there is obtained a spiral scanning with constant rise.

4. The device for optical-mechanical scanning of claim 1 wherein the angular velocity of said optical means around said second axis is constant and very much less than the angular velocity of said optical means around the optical axis, said angular velocity around the optical axis multiplied by the absolute value of the torsional angle around said second axis being constant whereby spiral scanning is obtained with constant rise and essentially constant speed.

5. The device for optical-mechanical scanning of claim 1, wherein the angular velocities around said optical and said second axes are constant, the angular velocity of said optical means around the optical axis is very much smaller than the angular velocity of said optical means around said second axis whereby there is obtained a nearly radial scanning.

* * * * *

UNITED STATES PATENT OFFICE
CERTIFICATE OF CORRECTION

Patent No. 3,977,760        Dated August 31, 1976

Inventor(s)  STIG LEOPOLD ULLSTIG

It is certified that error appears in the above-identified patent and that said Letters Patent are hereby corrected as shown below:

Column 2, Line 38, after the word "velocity" and before the " . " insert:  -- $\phi$ -- .

Signed and Sealed this

Twenty-third Day of November 1976

[SEAL]

Attest:

RUTH C. MASON  
Attesting Officer

C. MARSHALL DANN  
Commissioner of Patents and Trademarks